United States Patent
Kajino

(10) Patent No.: US 11,809,942 B2
(45) Date of Patent: Nov. 7, 2023

(54) ANTENNA DEVICE AND FURNITURE WITH ANTENNA DEVICE

(71) Applicant: System Japan Inc., Tokyo (JP)

(72) Inventor: Yoshiyuki Kajino, Tokyo (JP)

(73) Assignee: System Japan Inc., Tokyo (JP)

(*) Notice: Subject to any disclaimer, the term of this patent is extended or adjusted under 35 U.S.C. 154(b) by 49 days.

(21) Appl. No.: 17/769,018

(22) PCT Filed: Oct. 21, 2019

(86) PCT No.: PCT/JP2019/041259
§ 371 (c)(1),
(2) Date: Apr. 14, 2022

(87) PCT Pub. No.: WO2021/079398
PCT Pub. Date: Apr. 29, 2021

(65) Prior Publication Data
US 2023/0186038 A1    Jun. 15, 2023

(51) Int. Cl.
*G06K 7/10* (2006.01)
*H01Q 1/22* (2006.01)
*H01Q 7/00* (2006.01)

(52) U.S. Cl.
CPC ....... *G06K 7/10316* (2013.01); *H01Q 1/2216* (2013.01); *H01Q 7/00* (2013.01)

(58) Field of Classification Search
CPC ..... G06K 7/10316; H01Q 1/2216; H01Q 7/00
See application file for complete search history.

(56) References Cited

U.S. PATENT DOCUMENTS

2008/0042850 A1    2/2008 De Witte et al.
2009/0085746 A1*   4/2009 Erickson ............ H01Q 21/0025
                                                 340/572.1
(Continued)

FOREIGN PATENT DOCUMENTS

EP    3340483 A1 *  6/2018  ............ E21B 41/00
GB    2460234 A  * 11/2009  ....... G06K 19/07786
(Continued)

OTHER PUBLICATIONS

International Search Report for PCT/JP2019/041259, dated Dec. 24, 2019, Total of 2 pages.

*Primary Examiner* — Tuyen K Vo
(74) *Attorney, Agent, or Firm* — Apex Juris, pllc; Hilde Coeckx

(57) ABSTRACT

An antenna device which includes an antenna structure constituted of a conductive material layer formed on a dielectric planar substrate, and configured to communicate with a radio frequency identification tag, wherein the antenna structure includes an active electrode group, a passive electrode group, and a loop type plane electrode which connects the active electrode group to feeding points, an electromagnetic field is produced between the active electrodes and the passive electrodes by electromagnetic induction, an electromagnetic field which is different from the electromagnetic field in phase is produced between the loop type plane electrode and the passive electrodes by an electromagnetic mutual interference, and electromagnetic field density on the dielectric planar substrate is raised while forming magnetic fields with different phases within the same electromagnetic field.

8 Claims, 6 Drawing Sheets

(56) References Cited

U.S. PATENT DOCUMENTS

| | | | |
|---|---|---|---|
| 2009/0152353 A1* | 6/2009 | Tsirline | G06K 7/0008 |
| | | | 347/2 |
| 2010/0103055 A1* | 4/2010 | Waku | H01Q 7/005 |
| | | | 343/702 |
| 2015/0249485 A1* | 9/2015 | Ouyang | H01Q 9/42 |
| | | | 455/552.1 |
| 2017/0098106 A1* | 4/2017 | Roesner | G06K 19/07758 |
| 2018/0013201 A1* | 1/2018 | Pong | H01Q 7/00 |
| 2019/0266467 A1* | 8/2019 | Kato | G06K 19/07773 |
| 2019/0325284 A1* | 10/2019 | Forster | G06K 19/0723 |
| 2019/0326954 A1* | 10/2019 | Sebastian | H04B 5/0031 |
| 2021/0303813 A1* | 9/2021 | Pohl | H04B 5/0075 |

FOREIGN PATENT DOCUMENTS

| | | | |
|---|---|---|---|
| GB | 2585352 A * | 1/2021 | G06K 19/0708 |
| JP | 2010-241576 A | 10/2010 | |
| WO | WO2010/067462 A1 | 6/2010 | |

\* cited by examiner

ANTENNA DEVICE AND FURNITURE WITH ANTENNA DEVICE

CROSS-REFERENCE TO RELATED APPLICATIONS

This application is a U.S. National Phase of International Application No. PCT/JP2019/041259, filed on Oct. 21, 2019. The entire contents of the above-listed application is hereby incorporated by reference for all purposes.

TECHNICAL FIELD

The present disclosure relates to an antenna device which is hardly affected by a frequency band of a driving power supply section, which is sophisticated with less directivity, and which exerts preferred antenna characteristics when used in a reader/writer which communicates with a radio frequency identification tag. The present disclosure further relates to furniture provided with such an the antenna device.

BACKGROUND ART

A radio frequency identification tag system has been conventionally used for managing various kinds of articles, e.g., books, CDs (compact discs), or DVDs (digital versatile discs).

The radio frequency identification tag system in conventional examples has a reader/writer and an antenna device connected to the reader/writer, and electric power output from the reader/writer is radiated as electric waves toward a radio frequency identification tag through the antenna device.

Further, the radio frequency identification tag is configured to receive the electric power or an electromagnetic field radiated from the antenna device, thereby obtain driving power, and transmit data to the reader/writer through the antenna device.

In such a conventional radio frequency identification tag system, to operate the radio frequency identification tag, the radio frequency identification tag must be placed within a communication zone where the electric power having predetermined power density or more or the electromagnetic field having predetermined magnetic force density or more is radiated from the antenna device, and development of the antenna device which forms various communication areas has been demanded.

Japanese Patent No. 4340717 discloses an antenna device which includes a dielectric substrate and an antenna structure constituted of a conductive material layer formed on the dielectric substrate and is configured to communicate with a radio frequency identification tag, in which the antenna structure includes a floating electrode group including a plurality of striated floating electrodes extending in parallel with each other in a first direction and kept in an electrically floating state and first and second antenna patterns formed to face each other to interpose the floating electrode group therebetween, electrically connected with each other, and having feeding points respectively, at least one of the first and second antenna patterns includes a plurality of striated floating electrodes which are periodically formed at predetermined intervals along a second direction orthogonal to the first direction, extend in parallel with each other in the first direction, and kept in the electrically floating state or a plurality of striated floating electrodes which are periodically formed at predetermined intervals in the first direction, extend in the second direction orthogonal to the first direction, and kept in the electrically floating state, a plurality of striated radiation electrodes which extend in parallel with the floating electrodes, and a loop electrode which connects the plurality of radiation electrodes with the feeding points, and the floating electrodes and the radiation electrodes are alternately and repeatedly formed along the first direction or the second direction.

In case of the antenna device, a fixed control pattern is produced from a frequency ratio for the plurality of striated floating electrodes extending in parallel and kept in the electrically floating state and the electrodes formed to face each other to interpose the floating electrode group therebetween, electrically connected to each other, and having the feeding points respectively, and a reading accuracy of the antenna device is enhanced.

In this case, the antenna pattern of the antenna device is constituted of the plurality of striated floating electrodes which are periodically formed at predetermined intervals in the same direction orthogonal to the electrodes having the electrical characteristics, extend in parallel with each other, and kept in the electrical floating state or the plurality of striated floating electrodes which are periodically formed at predetermined intervals in each direction and kept in the electrically floating state and the plurality of striated radiation electrodes which extend in parallel with the floating electrodes, but antenna characteristics differ depending on each frequency to be used.

SUMMARY OF INVENTION

Technical Problem

The present invention has been developed in view of the actual circumstances in the conventional examples and, based on the technology of Japanese Patent No. 4340717, and it provides an antenna device which is hardly affected by a frequency band to be used, sophisticated with less directivity, and exerts preferred antenna characteristics when used in a reader/writer which communicates with a radio frequency identification tag, and provides furniture with the antenna device.

Solution to Problem

The present disclosure provides an antenna device which includes an antenna structure constituted of a conductive material layer formed on a dielectric planar substrate, and is configured to communicate with a radio frequency identification tag, in which the antenna structure includes: an active electrode group which includes a plurality of striated active electrodes which extend in parallel with each other in a first direction, are kept in an electrically active state, and electrically connected with each other; a passive electrode group which includes a plurality of striated passive electrodes which extend in the same direction to sandwich the active electrode group therebetween, are formed to face each other, and not electrically connected with each other; and a loop type plane electrode which connects the plurality of active electrodes to feeding points, an electromagnetic field is produced between the active electrodes and the passive electrodes by electromagnetic induction, an electromagnetic field which is different from the electromagnetic field in phase is produced between the loop type plane electrode and the passive electrodes by an electromagnetic mutual interference, and electromagnetic field density on the dielectric planar substrate is raised while forming magnetic fields with different phases within the same electromagnetic field.

Advantageous Effects of Invention

According to the present disclosure, it is possible to realize and provide an antenna device which is hardly affected by a frequency band to be used, sophisticated with less directivity, and exerts preferred antenna characteristics when used in a reader/writer which communicates with a radio frequency identification tag.

According to the present disclosure, it is possible to realize and provide an antenna device which has an electromagnetic field region whose area can be expanded alone.

According to the present disclosure, it is possible to realize and provide an antenna device which is beneficial for use in applications requiring a communication area constituted of two electromagnetic field regions.

According to the present disclosure, it is possible to realize and provide an antenna device which is beneficial for use in applications requiring a communication area constituted of two electromagnetic field regions having different high and low electromagnetic field densities respectively.

According to the present disclosure, since widths of the active electrodes and the passive electrodes are substantially equally set, it is possible to realize and provide an antenna device which can uniformize the electromagnetic field densities on the dielectric planar substrate.

According to the present disclosure, since the coupler circuit and the capacitor connecting section configured to adjust antenna sensitivity are formed with the use of the conductive material layer configured to form the loop electrode, it is possible to realize and provide an antenna device which facilitates the antenna sensitivity adjustment of the antenna device.

It is possible to realize and provide an antenna device which adequately enables management or identification of an article provided with a radio frequency identification tag arranged on furniture or accommodated in the furniture by attaching an antenna device.

It is possible to realize and provide furniture with an antenna device which includes the disclosed antenna device connected with a reader/writer arranged on the furniture or accommodated in the furniture and is configured so that an article provided with a radio frequency identification tag on the furniture or in the furniture can be managed or identified, thereby adequately managing or identifying the article.

DESCRIPTION OF EMBODIMENTS

Figure 1:
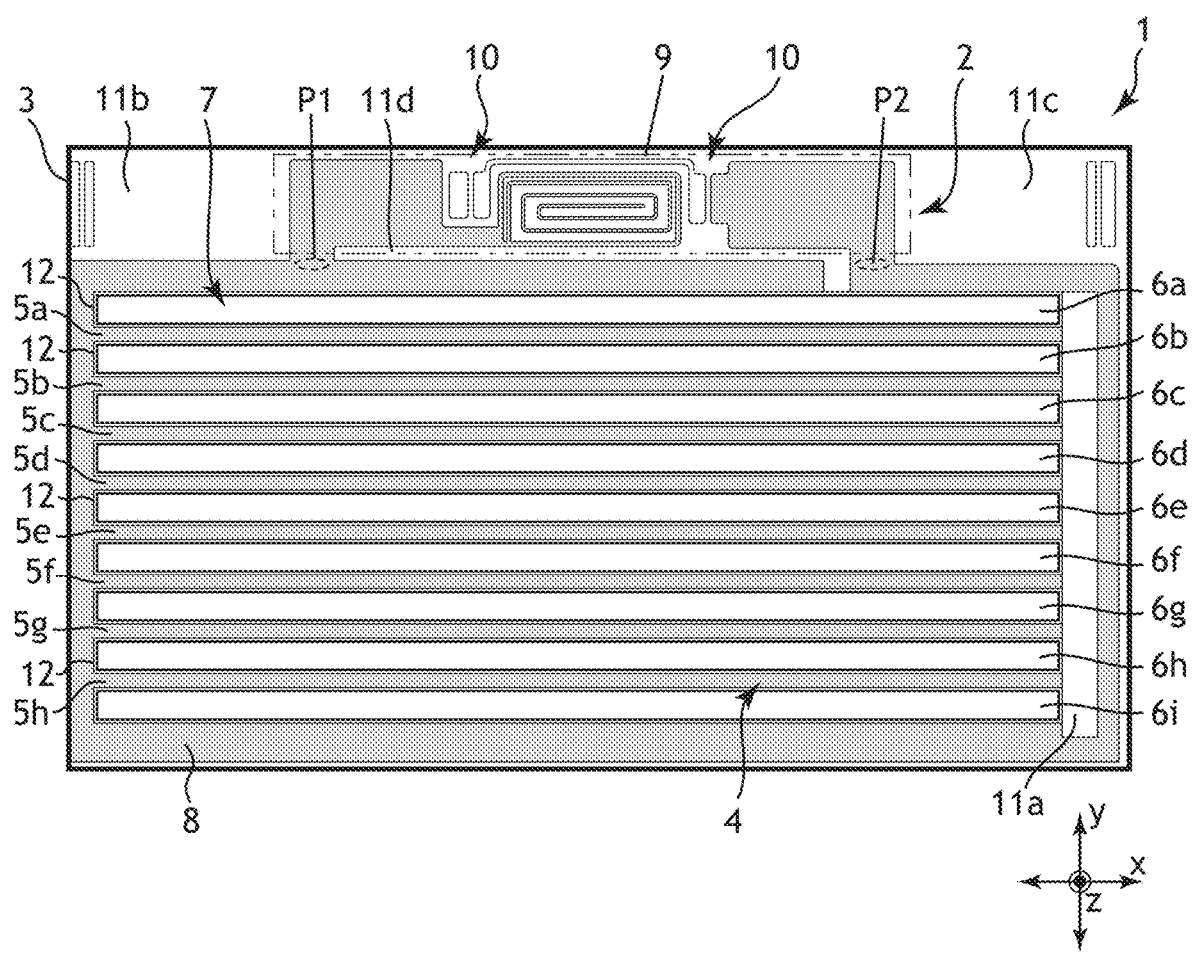
FIG. 1 is a schematic plan view of an antenna device according to Example 1 of the present disclosure.

The present disclosure has achieved the object of realizing and providing an antenna device which is hardly affected by a frequency band of a driving power supply section, which is sophisticated with less directivity, and which exerts preferred antenna characteristics when used in a reader/writer which communicates with a radio frequency identification tag by the antenna device which includes an antenna structure constituted of a conductive material layer formed on a dielectric planar substrate and is configured to communicate with a radio frequency identification tag, wherein the antenna structure includes: an active electrode group which includes a plurality of striated active electrodes which extend in parallel with each other in a first direction, are kept in an electrically active state, and electrically connected with each other; a passive electrode group which includes a plurality of striated passive electrodes which extend in the same direction to sandwich the active electrode group therebetween, are formed to face each other, and not electrically connected with each other; a loop type plane electrode which connects the plurality of active electrodes to feeding points; and a non-feeding section formed in a region adjacent to the active electrode group and the passive electrode group on the dielectric planar substrate, an electromagnetic field is produced between the active electrodes and the passive electrodes by electromagnetic induction, an electromagnetic field which is different from the electromagnetic field in phase is produced between the loop type plane electrode and the passive electrodes by an electromagnetic mutual interference, electromagnetic field density on the dielectric planar substrate is raised while forming magnetic fields with different phases within the same electromagnetic field, the non-feeding section is allowed to function as a reflector, and a single electromagnetic field region is formed on the dielectric planar substrate.

EXAMPLES

A description will now be given below on an antenna device and furniture with the antenna device according to an example of the present invention with reference to the drawings.

Example 1

An antenna device 1 according to Example 1 of the present invention will now be described hereinafter with reference to FIG. 1 and FIG. 2.

First, an outline will be given as to a radio frequency identification tag system provided with the antenna device 1 according to Example 1.

The radio frequency identification tag system provided with the antenna device 1 includes an information input/output device (a computer), a reader/writer, the antenna device 1, and the radio frequency identification tag attached to each of various kinds of articles, and it is used for identifying or managing each article having the radio frequency identification tag attached thereto.

The reader/writer which functions as a driving power supply section carries out supply of electric power or a magnetic field and transmission of signals to the radio frequency identification tag in a wireless manner through the antenna device 1, and also carries out wireless reception of signals transmitted from the radio frequency identification tag through the antenna device 1.

The antenna device 1 according to Example 1 includes an antenna structure 2 constituted of a conductive material layer formed on a dielectric planar substrate 3 and, although not shown, it is the antenna device 1 which performs wireless communication with the radio frequency identification tag.

The antenna structure 2 includes an active electrode group 4 including a plurality of (eight in Example 1) striated active electrodes 5a to 5h extending in parallel with each other in a first direction (an x direction), kept in an electrically active state, and electrically connected with each other, a passive electrode group 7 including a plurality of (nine in Example 1) striated passive electrodes 6a to 6i extending in the same direction to sandwich the active electrode group 4 therebetween, formed to face each other, and not electrically connected with each other, and a loop electrode (a loop type plane electrode) 8 which connects the respective active electrodes 5a to 5h with feeding points P1 and P2 which are provided on a part of the conductive material layer formed on the dielectric planar substrate 3 and to which driving power is supplied from a non-illustrated driving power supply section.

The loop electrode 8 is mainly formed of a conductive material layer on the dielectric planar substrate 3 along a peripheral portion of the dielectric planar substrate 3 to surround nearly the entire passive electrodes 6a to 6i.

Further, in the antenna structure 2 is provided a capacitor connecting section 10 configured to connect a coupler circuit 9 which adjusts antenna sensitivity with the use of the a conductive material layer which forms a part of the loop electrode 8 and also configured to connect a non-illustrated capacitor which adjusts the antenna sensitivity.

The antenna structure 2 of the antenna device 1 according to this Example 1 forms a rectangular non-feeding section 11a where no conductive material layer is present between itself and a region adjacent to the active electrode group 4 and the passive electrode group 7 on the dielectric planar substrate 3 which is also a region of a part of the loop electrode 8 on a right side in FIG. 1.

Besides, the antenna structure 2 of the antenna device 1 according to this Example 1 forms non-feeding sections 11b and 11c where no conducive material layer is present in an upper left corner portion and an upper right corner portion on the dielectric planar substrate 3 in FIG. 1 respectively, and also forms a narrow non-feeding section 11d in a region near the coupler circuit 9 and the capacitor connecting section 10.

As the dielectric planar substrate 3, it is possible to use a substrate of each of various resin materials such as PVC, PET, PC, ABS, or an acrylic resin, a glass epoxy substrate, a fluorine resin substrate, or the like.

In this Example 1, the conductive material layer including a copper layer and a solder layer is formed on a surface of the dielectric planar substrate 3, the active electrode group 4, the passive electrode group 7, and the loop electrode 8 are formed by an etching treatment or a marking-off treatment, and slit portions 12 which separates the passive electrode group 7 from the active electrode group 4 and the loop electrode 8 are provided.

Then, a description will now be given on an outline of a technique to form the active electrode group 4, the passive electrode group 7, and the loop electrode 8 based on an electromagnetic theory.

Surface areas of the active electrodes 5a to 5h of the active electrode group 4 and the passive electrodes 6a to 6i of the passive electrode group 7 are obtained by calculations while considering dimensions of the dielectric planar substrate 3 and dimensions of the non-feeding section 11d.

Further, vertical and horizontal lengths of the active electrodes 5a to 5h and the passive electrodes 6a to 6i are obtained by calculations, lengths and area ratios are calculated based on a length which is $1/64$ of a wavelength of a voltage or a current of the driving power supply section, ratios of the active electrodes 5a to 5h and the passive electrodes 6a to 6i are calculated, and lengths of the respective electrodes are determined based on the calculated numeral values.

Furthermore, a method to be used for reading the radio frequency identification tags is taken into consideration, a calculated value of magnetic field density on the dielectric planar substrate 3 is also taken into consideration, and widths of the respective electrodes are determined.

Consequently, the active electrodes 5a, 5b, 5c . . . and the passive electrodes 6a, 6b, 6c, . . . which have been set in length, width, and number to be arranged are formed on the surface of the dielectric planar substrate 3.

That is, in the antenna device 1 according to this Example 1, electrical characteristics of electric field strength are set based on positions of the feeding points P1 and P2, and contact areas and positions are set based on the electrode widths of the active electrodes 5a to 5h and the passive electrodes 6a to 6i.

At this time, a frequency or a wavelength does not relate to the positional settings. As to the electrical characteristics, characteristics that a connected portion becomes strongest are used.

Giving a detailed description, a slight phase shift of an electromagnetic field on the surface of the dielectric planar substrate 3 due to a reflected wave by the non-feeding section 11a is obtained by a calculation, and distances between respective adjacent electrodes, areas of corresponding respective electrodes, positions of the feeding points P1 and P2, the number of the respective electrodes, and others are set.

Figure 2:
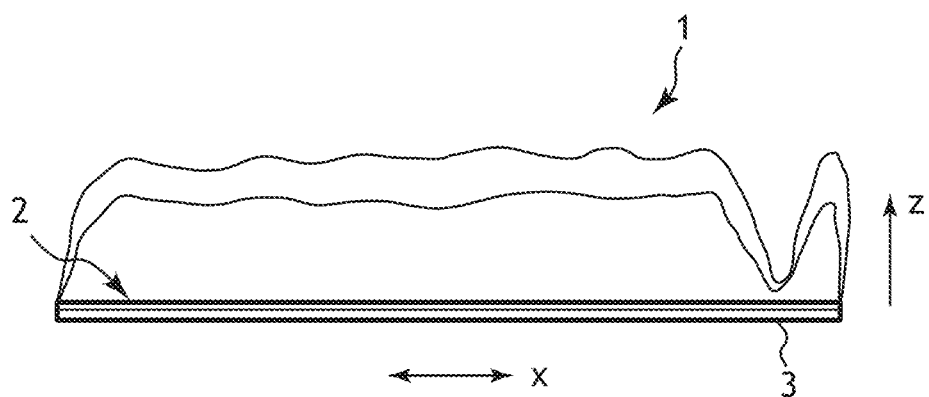
FIG. 2 is an explanatory drawing schematically showing an electromagnetic field distribution on a dielectric planar substrate of the antenna device according to Example 1.

According to the antenna device 1 of this Example 1, an electromagnetic field is produced between the active electrodes 5a to 5h and the passive electrodes 6a to 6i by electromagnetic induction, an electromagnetic field which is different from the electromagnetic field in phase is produced between the loop electrode 8 and the passive electrodes 6a to 6i by an electromagnetic mutual interference, electromagnetic field density on the dielectric planar substrate 3 is raised while constituting a magnetic field having a different phase within the same electromagnetic field, an electromagnetic field emission distance is increased, the non-feeding section 11a is allowed to function as a reflector, and an electromagnetic field region extending over a region which substantially corresponds to a region where the passive electrode group 7 is present can be solely formed on the dielectric planar substrate 3 (an x-z surface) as schematically shown in FIG. 2.

Based on an observation result shown in FIG. 2, it is possible to realize the antenna device 1 which is beneficial for use applications requiring a single communication area which has a relatively wide area.

Consequently, it is possible to provide the antenna device 1 which enables reading each of approximately 10 overlapping radio frequency identification tags as detection targets which are close in distance, overcomes a reading failure of many radio frequency identification tags present in the same magnetic field due to a voltage drop or the like by raising the electromagnetic field density, enables reading the plurality of radio frequency identification tags by a single structure, is hardly affected by a frequency band of the driving power supply section, sophisticated with less directivity, enables reading a radio frequency identification tag without restriction in directions, e.g., from vertical, horizontal, and diagonal directions in relation to a position of the tag to the antenna surface, and has a single expandable electromagnetic field region.

Example 2

Figure 3:
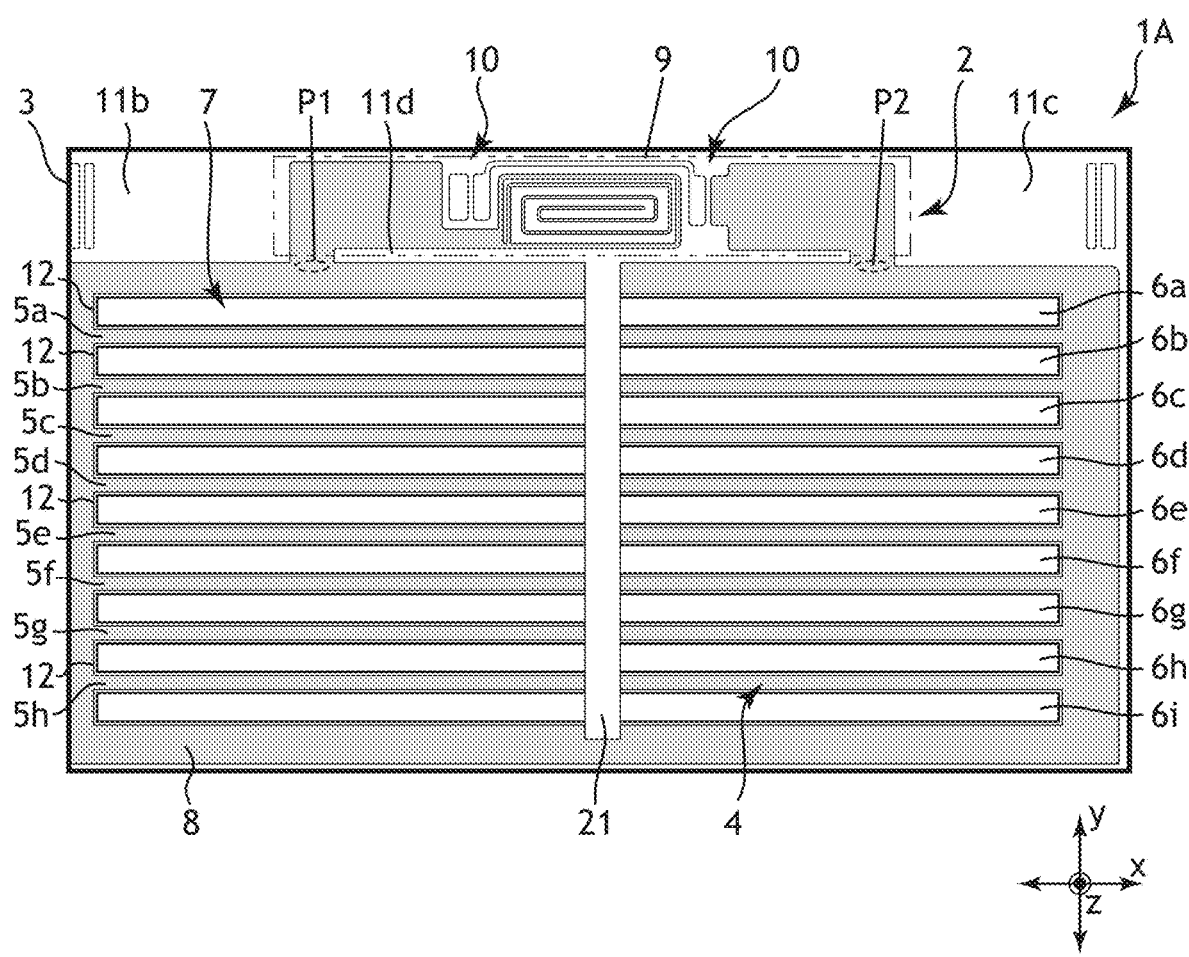
FIG. 3 is a schematic plan view of an antenna device according to Example 2 of the present disclosure.

An antenna device 1A according to Example 2 of the present invention will now be described hereinafter with reference to FIG. 3 and FIG. 4.

It is to be noted that, in the antenna device 1A according to this Example 2, like reference numerals denote elements equal to those in the antenna device 1 according to Example 1, and a detailed description thereof will be omitted.

Figure 4:
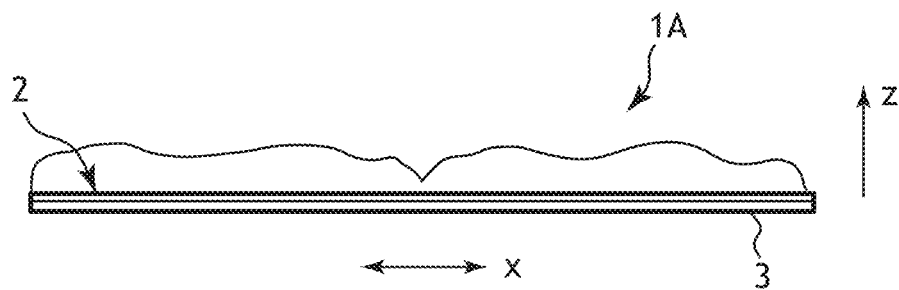
FIG. 4 is an explanatory drawing schematically showing an electromagnetic field distribution on a dielectric planar substrate of the antenna device according to Example 2 of the present disclosure.

The antenna device 1A according to this Example 2 has a basic structure which is the same as that of the antenna device 1 according to Example 1 described above, but is characterized in that a non-feeding section 21 where no conductive material layer is present is formed in a region which halves the active electrode group 4 and the passive electrode group 7 on the dielectric planar substrate 3 in place of the non-feeding section 11a, the non-feeding section is allowed to function as a reflector, and such two electromagnetic field regions as schematically shown in FIG. 4 are formed on the dielectric planar substrate 3 with the non-feeding section 21 arranged as a boundary.

Based on an observation result shown in FIG. 4, it is possible to realize the antenna device 1A which is beneficial for use applications requiring a communication area constituted of the two electromagnetic field regions.

According to the antenna device 1A of this Example 2, it is possible to provide the antenna device 1A which exerts substantially the same effects as those of the antenna device 1 according to Example 1 described above and is beneficial for use applications requiring a communication area constituted of the two electromagnetic field regions.

Example 3

Figure 5:
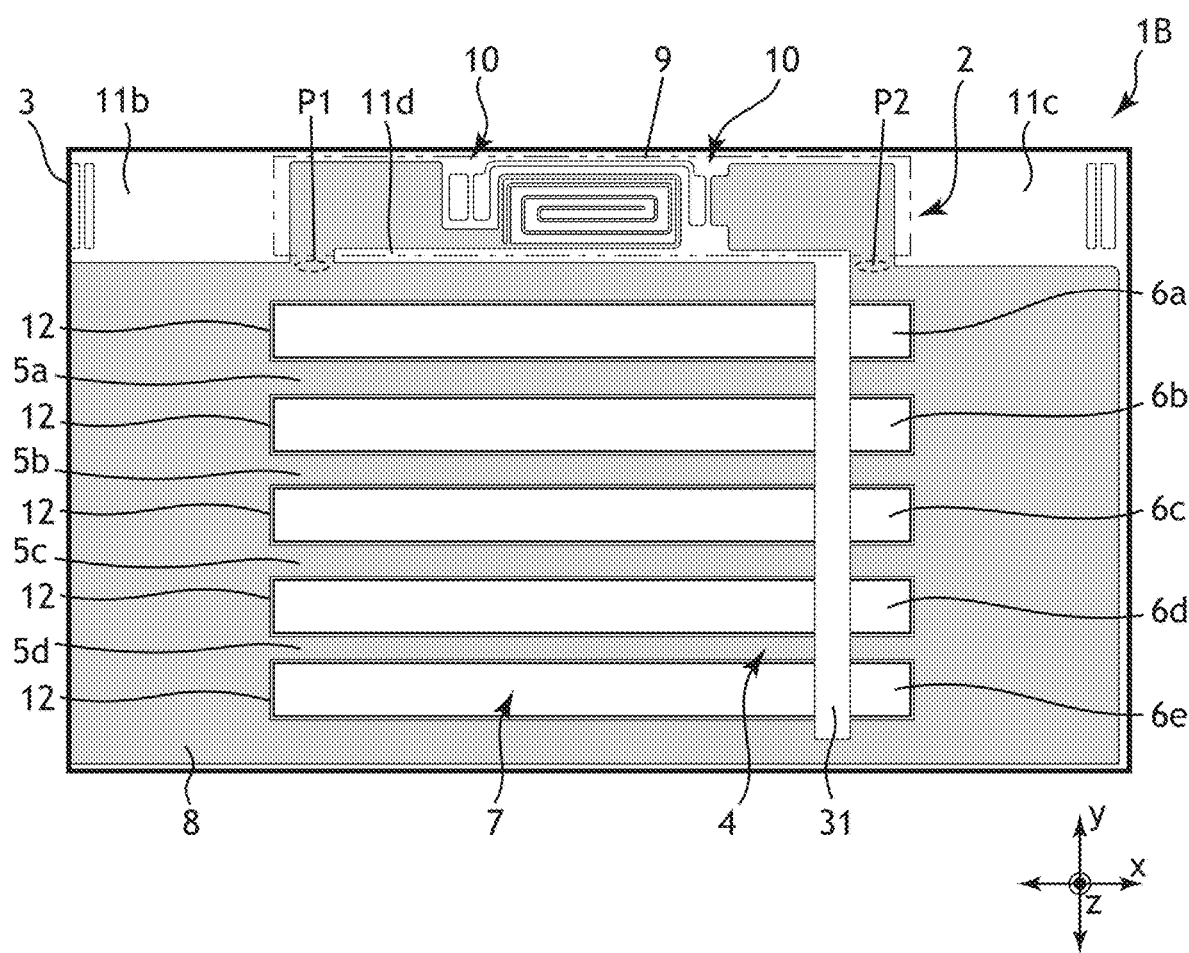
FIG. 5 is a schematic plan view of an antenna device according to Example 3 of the present disclosure.
Figure 6:
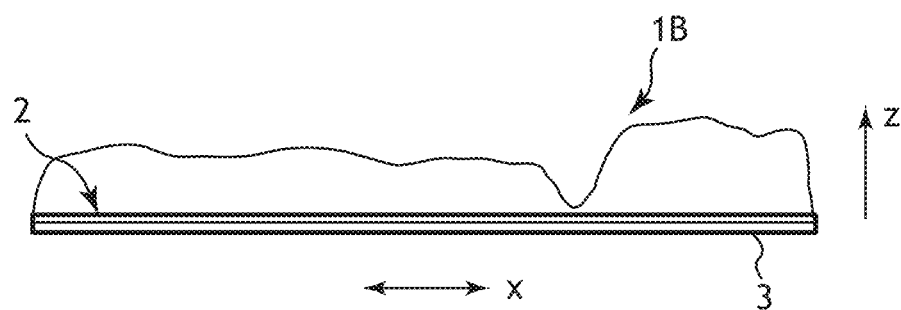
FIG. 6 is an explanatory drawing schematically showing an electromagnetic field distribution on a dielectric planar substrate of the antenna device according to Example 3.

An antenna device 1B according to Example 3 of the present invention will now be descried with reference to FIG. 5 and FIG. 6.

It is to be noted that, in the antenna device 1B according to this Example 3, like reference numerals denote elements equal to those in the antenna device 1 according to Example 1 described above, and a detailed description thereof will be omitted.

The antenna device 1B according to this Example 3 has a basic structure which is the same as that of the antenna device 1 according to Example 1 described above, but is characterized in that a non-feeding section 31 where no conductive material layer is present is formed in a region which divides the active electrode group 4 and the passive electrode group 7 into large and small groups on the dielectric planar substrate 3 in place of the non-feeding section 11a, areas of both corners of the loop electrode 8 along an x direction are increased larger than those in Examples 1 and 2 by making respective lengths of the active electrode group 4 and the passive electrode group 7 shorter than those in Examples 1 and 2, the active electrode group 4 is formed of four active electrodes 5a to 5d, and the passive electrode group 7 is formed of five passive electrodes 6a to 6e.

FIG. 6 schematically shows two electromagnetic field regions on the dielectric planar substrate 3 of the antenna device 1B according to this Example 3.

Based on an observation result shown in FIG. 6, it is possible to realize the antenna device 1B beneficial for use applications requiring a communication area constituted of the two electromagnetic field regions whose electromagnetic field densities are relatively different in level with the non-feeding section 31 arranged as a boundary.

In this case, in the antenna device 1B according to this Example 3, electromagnetic field levels of the two electromagnetic field regions whose magnetic field densities are different in level are smaller than those in Example 2 due to the above-described structure.

According to the antenna device 1B of this Example 3, it is possible to provide the antenna device 1B which exerts substantially the same effects as those of the antenna device 1 according to Example 1 described above and is beneficial for use applications requiring a communication area constituted of the two electromagnetic field regions whose electromagnetic field densities are different in level.

As a use application of the antenna device 1, 1A, or 1B, for example, although not shown, the antenna device can be attached to furniture, a book shelf, an article storing shelf, or the like, and it can be used for managing or identifying an article which has a radio frequency identification tag attached thereto and is arranged in the furniture and the like or accommodated in the furniture and the like.

Further, although not shown in particular, it is possible to configure furniture with the antenna device which includes any one of the antenna devices 1, 1A, and 1B connected with a reader/writer arranged on the furniture or accommodated in the furniture so that an article having a radio frequency identification tag attached thereto on the furniture or in the furniture can be managed or identified.

In place of the furniture with the antenna device, it is also possible to adopt a book shelf, an article storing shelf, or the like and provide the book shelf with the antenna device, the article storing shelf with the antenna device, and the like.

The present invention can be modified or changed in many ways without being restricted to Examples 1 to 3 described above.

For example, the widths and the number of the respective electrodes in the active electrode group 4 and the passive electrode group 7 can be modified in many ways in correspondence with a size of the dielectric planar substrate 3, a size of the communication area to be formed, characteristics of an article to be managed, characteristics and a size of a radio frequency identification tag attached to the article, and required characteristics such as impedance values of the antenna devices 1, 1A, and 1B.

INDUSTRIAL APPLICABILITY

The antenna device according to the present invention is very widely available for use applications where the antenna device is applied to the above-described furniture and the like to manage an article having a radio frequency identification tag attached thereto on the furniture and the like or in the furniture and the like, where the antenna device is arranged on a conveyor line at a manufacturing site of components and the like in each of various factories to manage the manufacture of the components and the like, or where the antenna device is arranged on an article display shelf and the like of an article selling store to manage sales of articles for sale.

REFERENCE SIGNS LIST 1 antenna device
1A antenna device (of Example 2)
1B antenna device (of Example 3)
2 antenna structure
3 dielectric planar substrate
4 active electrode group
5a to 5h active electrodes
6a to 6i passive electrodes
7 passive electrode group
8 loop electrode (loop type plane electrode)
9 coupler circuit
10 capacitor connecting section
11a to 11d non-feeding sections
12 slit portion
21, 31 non-feeding section
P1, P2 feeding point

The invention claimed is:

1. An antenna device which comprises an antenna structure constituted of a conductive material layer formed on a dielectric planar substrate and is configured to communicate with a radio frequency identification tag,
wherein the antenna structure comprises:
an active electrode group which comprises a plurality of striated active electrodes which extend in parallel with each other in a first direction, are kept in an electrically active state, and electrically connected with each other;
a passive electrode group which comprises a plurality of striated passive electrodes which extend in the same direction to sandwich the active electrode group therebetween, are formed to face each other, and not electrically connected with each other; and
a loop type plane electrode which connects the plurality of active electrodes to feeding points, and
an electromagnetic field is produced between the active electrodes and the passive electrodes by electromagnetic induction, an electromagnetic field which is different from the electromagnetic field in phase is produced between the loop type plane electrode and the passive electrodes by an electromagnetic mutual interference, and electromagnetic field density on the dielectric planar substrate is raised while forming magnetic fields with different phases within the same electromagnetic field.

2. The antenna device of claim 1,
wherein the antenna structure further comprises:
a non-feeding section formed in a region adjacent to the active electrode group and the passive electrode group on the dielectric planar substrate, and wherein
the non-feeding section is allowed to function as a reflector, and a single electromagnetic field region is formed on the dielectric planar substrate.

3. The antenna device of claim 1,
wherein the antenna structure further comprises:
a non-feeding section formed in a region which divides the active electrode group and the passive electrode group in half on the dielectric planar substrate, and wherein
the non-feeding section is allowed to function as a reflector, and electromagnetic field regions are formed at two positions on the dielectric planar substrate with the non-feeding section arranged as a boundary.

4. The antenna device of claim 1,
wherein the antenna structure further comprises:
a non-feeding section formed in a region which divides the active electrode group and the passive electrode group into large and small groups on the dielectric planar substrate, and wherein
the non-feeding section is allowed to function as a reflector, and electromagnetic field regions whose electromagnetic field densities are relatively different in level are formed at two positions on the dielectric planar substrate with the non-feeding section arranged as a boundary.

5. The antenna device according to claim 1, wherein widths of the active electrodes and the passive electrodes are substantially equally set.

6. The antenna device according to claim 1, wherein a conductive material layer which forms the loop electrode is used to form a coupler circuit and a capacitor connecting section configured to adjust antenna sensitivity.

7. The antenna device according to claim 1, wherein the antenna device is attached to furniture and used for managing or identifying an article which has a radio frequency identification IC tag attached thereto and arranged on the furniture or accommodated in the furniture.

8. Furniture with an antenna device, the furniture comprising the antenna device of claim 1 connected with a reader/writer arranged on the furniture or accommodated in the furniture, wherein an article having a radio frequency identification tag attached thereto on the furniture or in the furniture is managed or identified.

* * * * *